United States Patent
Fetz

[19]

[11] Patent Number: 5,604,770
[45] Date of Patent: Feb. 18, 1997

[54] PI/4 DQPSK MODULATION WITH COARSE MAPPER PRECESSION AND FINE FILTER PRECESSION

[75] Inventor: Brian P. Fetz, Veradale, Wash.

[73] Assignee: Hewlett-Packard Company, Palo Alto, Calif.

[21] Appl. No.: 322,899

[22] Filed: Oct. 13, 1994

[51] Int. Cl.⁶ .................................................. H04K 1/02
[52] U.S. Cl. .................. 375/296; 375/261; 375/281; 375/283; 375/284; 375/298; 332/103
[58] Field of Search ........................... 375/261, 265, 375/279–284, 298, 302, 308, 329–333, 350, 271, 285, 295, 296, 300; 332/103–105; 329/304, 310; 371/37.4

[56] References Cited

U.S. PATENT DOCUMENTS

| 5,363,410 | 11/1994 | Hayashi | 375/308 |
| 5,379,322 | 1/1995 | Kosaka et al. | 375/296 |
| 5,428,643 | 6/1995 | Razzell | 375/308 |

OTHER PUBLICATIONS

David M. Hoover, "An Instrument for Testing North American Digital Cellular Radios", Hewlett-Packard Journal, Apr. 1991, pp. 65–72.

Primary Examiner—Stephen Chin
Assistant Examiner—Amanda T. Le
Attorney, Agent, or Firm—Edward L. Miller

[57] ABSTRACT

The amount of memory needed for a ROM-based π/4 DQPSK filter is reduced by using a mapper in an IQ modulator (inverse mapper in a demodulator) that incorporates a 90° phase shift for every other symbol. During the intervening symbols no additional phase shift is incorporated by the mapper. This produces a coarse precession of 90° for every other symbol. The 90° of coarse precession may be produced by using alternate DQPSK mappers for alternate symbols. Both mappers share a common repertoire, so no new modulation state symbols are required. During the alternate 0° symbols the filter inserts a 45° phase shift, but does not insert such a 45° phase shift during those intervening times when the mapper (or inverse mapper) is inserting a 90° phase shift. This produces a fine precession. The result is to produce a uniform precession of 45° between each modulation state symbol. The technique described involves allocating part of the precession to the mapper (coarse precession) and a remaining part (fine precession) to the filter. In a preferred case: the amount of overall precession is half the nominal symbol-to-symbol phase period; the coarse precession from the mapper equals the nominal symbol-to-symbol phase period and ocurrs every other symbol; and, the fine precession from the filter ocurrs on intervening symbols and can be represented by a single bit. Other amounts of coarse precession from the mapper and fine precession from the filter are concievable, however, which may involve more than one bit of description for the fine precession.

6 Claims, 8 Drawing Sheets

|  | 90° MAPPER (ODD) NEW DATA SYMBOL | | | |
|---|---|---|---|---|
|  | 0°<br>0 0 | +90°<br>0 1 | 180°<br>1 1 | -90°<br>1 0 |
| 0 0  A | 0 1  B | 1 1  C | 1 0  D | 0 0  A |
| 0 1  B | 1 1  C | 1 0  D | 0 0  A | 0 1  B |
| 1 1  C | 1 0  D | 0 0  A | 0 1  B | 1 1  C |
| 1 0  D | 0 0  A | 0 1  B | 1 1  C | 1 0  D |

PREV MOD STATE SYMBOL
(LAST_C LAST_D)

CELLS=NEXT MOD STATE SYMBOL ($C_K D_K$)

PI/4 DQPSK MODULATION WITH COARSE MAPPER PRECESSION AND FINE FILTER PRECESSION

The subject matter of this disclosure is related to that of U.S. Pat. No. 5,140,613 filed on May 25, 1990 by Raymond A. Birgenheier and David M. Hoover, assigned to Hewlett-Packard Co. and issued on Aug. 18, 1992. U.S. Pat. No. 5,140,613 is hereby incorporated herein by reference. It will also be useful to refer to the article on pages 65–72 in the April 1991 issue of the Hewlett-Packard Journal.

BACKGROUND OF THE INVENTION

IQ modulation is a technique of encoding a carrier with information by controlling both the magnitude and phase of the carrier. An IQ modulator is supplied with a carrier, an in-phase control input I and a quadrature control input Q. The IQ modulator modifies the amplitude and phase of the carrier in accordance with the values of the control inputs. In its most general form the amplitude and phase of the modulated carrier can vary independently and in continuous fashion. In some modulation formats the amplitude and phase of the carrier are constrained to assume only certain values. DQPSK and π/4 DQPSK are examples of such modulation formats. An implication of such formats is that the controlling I and Q input values to the IQ modulator vary abruptly in discrete steps. If they were allowed to do so, however, the spectral content of the resulting carrier could easily contain excessive amounts of undesirable components that fall outside a permissible passband. Such undesirable spectral content is frequently referred to as "splatter". To reduce such splatter to acceptable levels it is common practice to include filters to smooth the transitions of the I and Q control inputs to the IQ modulator.

To transmit a stream of digital information (the "program" information) the incoming stream of data is collected into groups of n-many consecutive bits. Each group of n-many bits then represents one of $2^n$ different possible data symbols that are the items of program data that are actually transmitted and received. An IQ encoder (or "mapper") in the transmitter trades the n-bit data symbols of program information for modulation state symbols that represent values of the I and Q control signals. A corresponding decoding mechanism ("reverse mapper") in the receiver trades the received modulation state symbol for its original n-bit sequence of program information. In many modulation formats the values of the I and Q control signals are each represented by one bit, so that a total of four different modulation state symbols are involved.

A communications channel having an IQ modulator at one end usually has an IQ demodulator at the other. It can be shown that the best signal to noise ratio for such a channel transmitting discrete symbols (i.e., a channel with digital modulation) is achieved when the channel, as a whole, is filtered according to a Nyquist filter whose half-power points are separated by half the symbol rate. Since it is desirable to incorporate identical filtering at each end of the channel, a root Nyquist filter is employed in both receiver and transmitter, to give the overall channel a combined Nyquist response.

A raised cosine filter meets these criteria, and has other desirable properties as well, if the roll-off value α is properly selected. It has been shown that for a symbol rate of 24.3 KHz a value of 0.35 for α is desirable for minimizing adjacent symbol interference while not unduly broadening the passband. (These parameters are, in fact, incorporated into the definition for the 30 KHz channel spacing NADC TDMA cellular telephone service.) To appreciate why this minimizes adjacent symbol interference it is useful to know that a Nyquist response implemented with a raised cosine filter involves the rather awkward notion of the filter beginning to produce an output before the symbol actually gets to the filter (so-called "negative time"). During this "negative time" the filter output periodically swings both above and below a quiescent level corresponding to no stimulus. Now, in an environment of consecutive modulation state symbols, whatever process for producing an output that the filter is following for the present symbol of interest, it is also still following for the symbol preceding that one, as well as for the symbol following the present symbol. All of these outputs add by superposition to form a composite value that is the present output of the filter. But, by arranging that each such swing (for symbols other than the symbol of present interest) has a zero crossing at the time that each present symbol is expected, these before and after swings in filter output always temporarily add to zero at those times when the output for the present symbol is expected. This summing to zero allows the filter's output to periodically represent only the present symbol, and then only the next present symbol, on so on. Thus, the output for the present symbol of interest is always produced at a time when residual outputs for adjacent symbols are zero.

A practical realization of such a filter is obtainable by capturing the last, say, eleven I and Q control values in shift registers having parallel outputs. After eleven input cycles the center I and Q values in these shift registers correspond to the present (albeit it not the newest) symbol. The I and Q values for the preceding five symbols are also present, as are the succeeding five symbols. All eleven values for I are applied to an "I filter", and all eleven values for Q are applied to a "Q filter". using all applied values, each filter acts on the center value, and its output is five symbols late, as it were. But this avoids the notion of "negative time". As new values are available they are shifted in and the oldest value is shifted out and discarded. Different systems may use different numbers of preceding and succeeding symbols, and those numbers need not be equal.

For the filter to do what is required, something therein must control the "trajectories" of the output I and Q control signals as they change from one value to the next in response to a changed input value. This is done by establishing what are called subintervals between the regularly scheduled changes in the values for I and Q. For example, the number of subintervals might be 16 ($2^4$). The filter is now also supplied, as an input, with the four bits that define the current subinterval. The subinterval increments regularly according to a clock signal that runs an appropriate amount faster than the symbol rate. Thus the output of each filter can be a selected trajectory for the I and Q control signals that is, in part, a desired function of time that minimizes spurious frequency content in the modulated carrier signal.

An additional splatter control technique resides in the difference between simple DQPSK and π/4 DQPSK. For DQPSK each transmitted symbol corresponds to the change in phase between the (new) present symbol and the symbol that preceded it. Generally, a transmitted symbol represents two bits of phase information corresponding to phase changes of 0°, +90°, −90° and 180°. The problem is that this can require the extreme phase change of 180° in the carrier to represent adjacent symbols, which in turn causes an undesirable amount of splatter.

In contrast, π/4 DQPSK never requires more than ±135° of phase shift. This is accomplished by introducing an additional 45° of phase shift between adjacent symbols. This constant underlying phase shift is termed "precession". Since the unit of precession is half of the 90° used as the fundamental unit in representing modulation symbols, it results in a second set of four symbols interleaved between the original set. However, the trap of treating this as doubling of the number of symbols can be avoided, even though the constellation diagrams now have eight points instead of four. Since the precession causes an alternation between the two sets of four phase values, any current value in one of the sets has as a legitimate successor only the four values of the other set. Thus, the trick is to understand that although there are zero to seven ($2^3$) instances of the precession's 45°, the demodulator in the receiver can map the eight points of the constellation diagram back into the original four symbols. However, the filters are presented with what now appears to be eight symbols, instead of four.

The filter for the π/4 DQPSK system described in the '613 patent to Birgenheier and Hoover represents this situation by using one bit each for I and Q, and three additional input bits to indicate the number of 45° increments (modulo 8, or, relative to a reference location on the unit circle of the constellation diagram). The three bits indicating the number of 45° phase shifts are necessary in their system because the mapper employed is the same as would be used for a DQPSK system (which has no precession), implying that the effective phase rotation caused by the precession in π/4 DQPSK must be accounted for in the filter.

As will be explained in the detailed description below, the approach used by the '613 patent causes the ROM based filters for π/4 DQPSK to use four times the number of addressable locations than are actually needed. It would be desirable if that additional memory could be eliminated to save size and cost, or if it could be used to provide extra functionality, instead.

SUMMARY OF THE INVENTION

The amount of memory needed for a ROM-based π/4 DQPSK filter is reduced by using a mapper in an IQ modulator (inverse mapper in a demodulator) that incorporates a 90° phase shift for every other symbol. During the intervening symbols no additional phase shift is incorporated by the mapper. At this point an examination of the precession embedded in a sequence of modulation state symbols would appear as "0° of precession, 90° of precession, 0° of precession, 90° of precession, 0° ... ". The 90° of precession may be produced by using alternate DQPSK mappers for alternate symbols. However, note that both mappers share a common repertoire, and that no new modulation state symbols are required. Further, during the alternate 0° symbols the filter inserts a 45° phase shift, but does not insert such a 45° phase shift during those intervening times when the mapper (or inverse mapper) is inserting a 90° phase shift. The result is to alter the precession values possessed by the sequence of modulation state symbols, which would now seem to be: 45°, 90°, 45°, 90°, .... However, the notation plays a trick on us if we are not careful. As far as the mapper is concerned, nothing it does has changed concerning either the 0° or the 90° symbols. By the terms of the example we really mean that the 90° of precession is referenced to the same place the 0° is referenced, which means we really ought to write: [0°, 90°], [0°, 90°], . . . and [45°, 90°], [45°, 90°], . . . .. But the term "precession" is generally used to mean a change from one symbol to the next. This allows us to remove the brackets from [45°, 90°], . . . to obtain 45°, 45°, 45°, 45°, . . . .. Thus, there is still an overall ±45° or ±135° phase shift between adjacent two-bit modulation state symbols, but the ROM's in the filters need only one bit of input to describe the presence or absence of the single 45° phase shift, as opposed to three bits to indicate a number of zero through seven of such 45° phase shifts.

The modulation format known as π/4 DQPSK can be thought of as having a nominal symbol-to-symbol phase shift of n X 90° (n=0, 1, 2, 3) on top of a symbol-to-symbol precession of 45°. It is not accidental that the amount of precession is half the symbol-to-symbol phase spacing. It would not absolutely have to be that way, although certain benefits arise when it is. The technique to be described involves allocating part of the precession to the mapper ("mapper", or "coarse" precession) and a remaining part ("filter", or "fine" precession) to the filter. In a preferred case: the amount of overall precession is half the nominal symbol-to-symbol phase period (i.e., carrier phase difference); the coarse precession from the mapper equals the nominal symbol-to-symbol phase period and occurs every other symbol; and, the fine precession from the filter occurs on intervening symbols and can be represented by a single bit. Other amounts of coarse precession from the mapper and fine precession from the filter are conceivable; however, they require more than one bit of description for the fine precession.

Upon reflection it will be appreciated that the new filtering technique can individually replace existing filters in modulators and demodulators, and that they need not be replaced in pairs. That is, a new-filter modulator will work as before with an old-filter demodulator, and an old-filter modulator will work with a new-filter demodulator. This is because the sequence of transmitted/received phase changes for the new filter remains unchanged; it is, after all, still π/4 DQPSK.

BRIEF DESCRIPTION OF THE DRAWINGS

FIG. 2 is a Karnough map that describes the operation of the even symbol 0° DQPSK mapper for the alternating symbol IQ mapper of FIG. 1;

FIG. 3 is a Karnough map that describes the operation of the odd symbol 90° DQPSK mapper for the alternating symbol IQ mapper of FIG. 1;

DESCRIPTION OF A PREFERRED EMBODIMENT

Figure 1A:
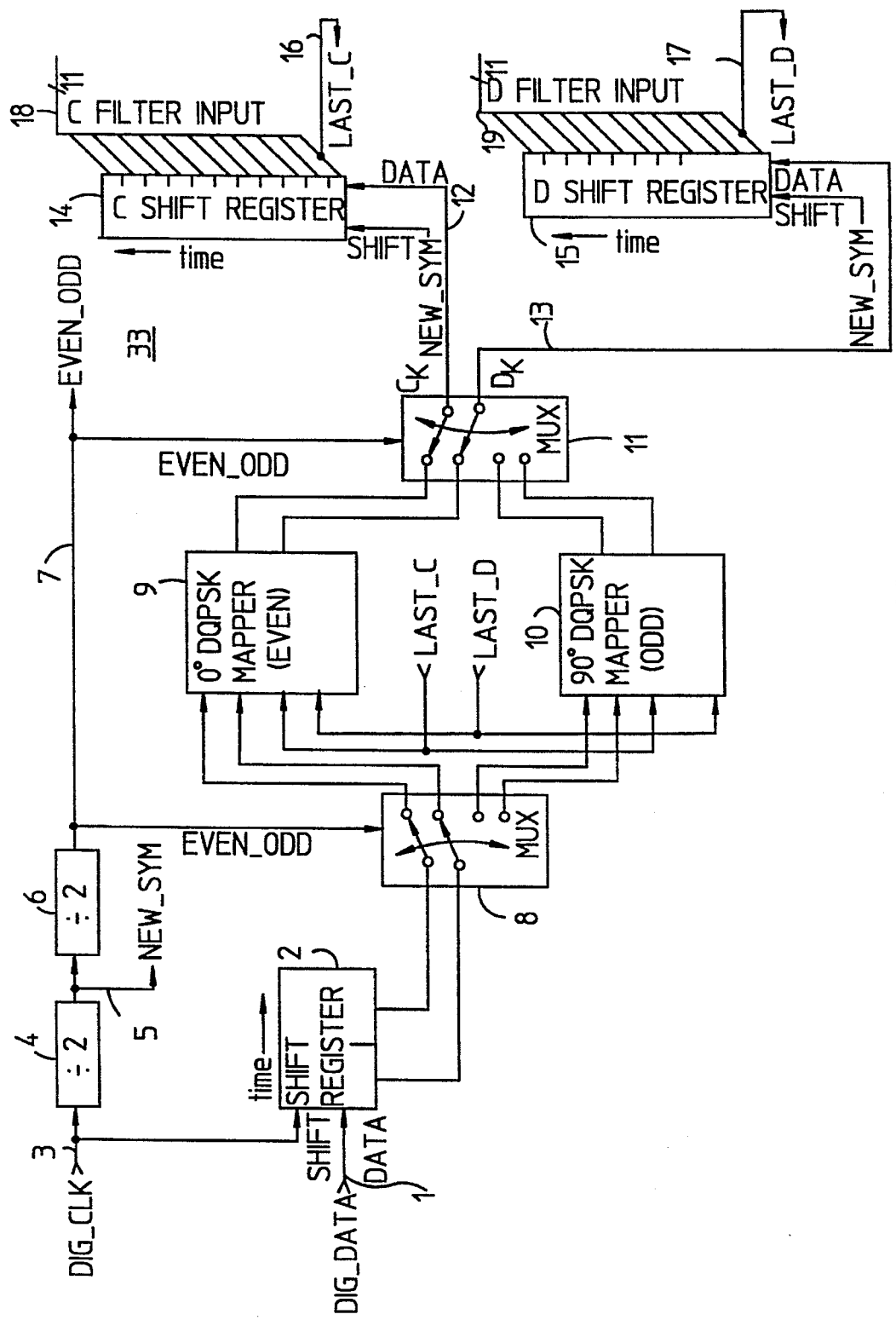
FIGS. 1A and 1B are a simplified block diagram of a portion of an IQ modulator that incorporates an alternating symbol 90° phase shift IQ mapper and an intervening symbol 45° phase shift IQ symbol filter.
Figure 1B:
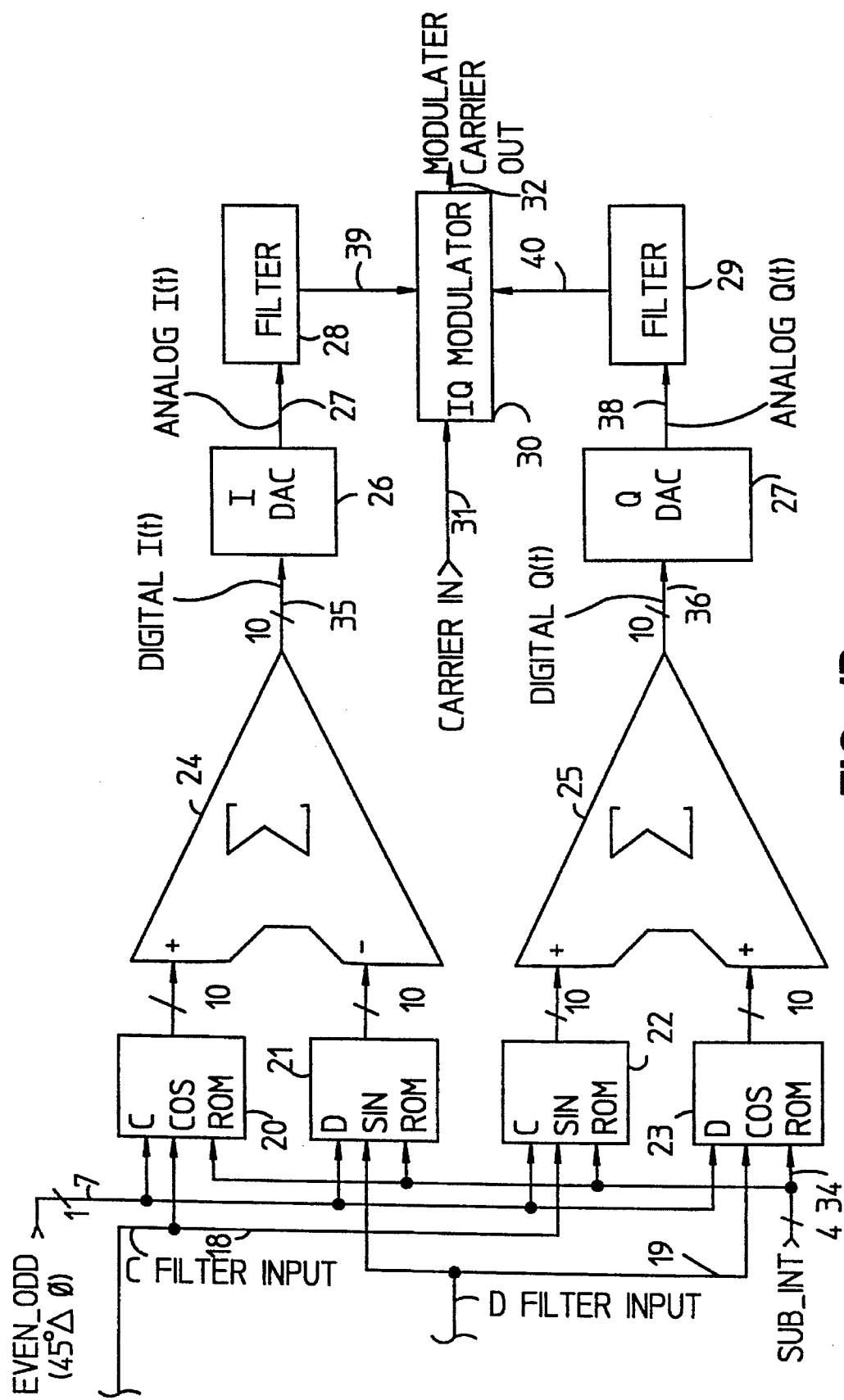

Refer now to FIGS. 1A–B, wherein is shown a simplified block diagram 33 of an IQ modulator constructed in accordance with the principles of the invention. A serial stream of digital data DIG_DATA 1 represents either a digitized version of analog program material to be transmitted, or a collection of data that exists in digital form in the first instance. A clock signal DIG_CLK 3 clocks the successive data values of DIG_DATA into a shift register 2. In the present example the stream of digital data is serial and the shift register 2 has two bits. It will be understood that this is exemplary of a cellular telephone incorporating π/4 DQPSK modulation, and that the principles of the invention may be employed even when the data is presented in a parallel, byte oriented format, and even if the underlying symbol-to-symbol precession rate is other than π/4 radians (45°) per symbol. It will also be understood that π/4 DQPSK modulation is merely one format for digital IQ modulation for which the teachings of the invention are applicable.

Shift register 2 accomplishes a serial-to-parallel conversion; the conversion produces pairs of bits that are treated as incoming program data symbols. The clock signal DIG_CLK 3 is applied to a (by two) divider 4 whose output 5 is a signal NEW_SYM. An edge of NEW_SYM 5 occurs once each time shift register 2 is occupied by a new pair of bits. The clock signal NEW_SYM 5 is itself applied to another (by two) divider 6 to produce a signal EVEN_ODD 7. EVEN_ODD is used to group the program data symbols in the shift register 2 into two collections; every other pair of bits in shift register 2 belongs to the "even" collection, whilst the intervening pairs are said to be in the "odd" collection. This business of even and odd is mere labelling; there is no implication that the first symbol in a string is to be odd because one is an odd number, and the second even because two is an even number.

Figure 2:
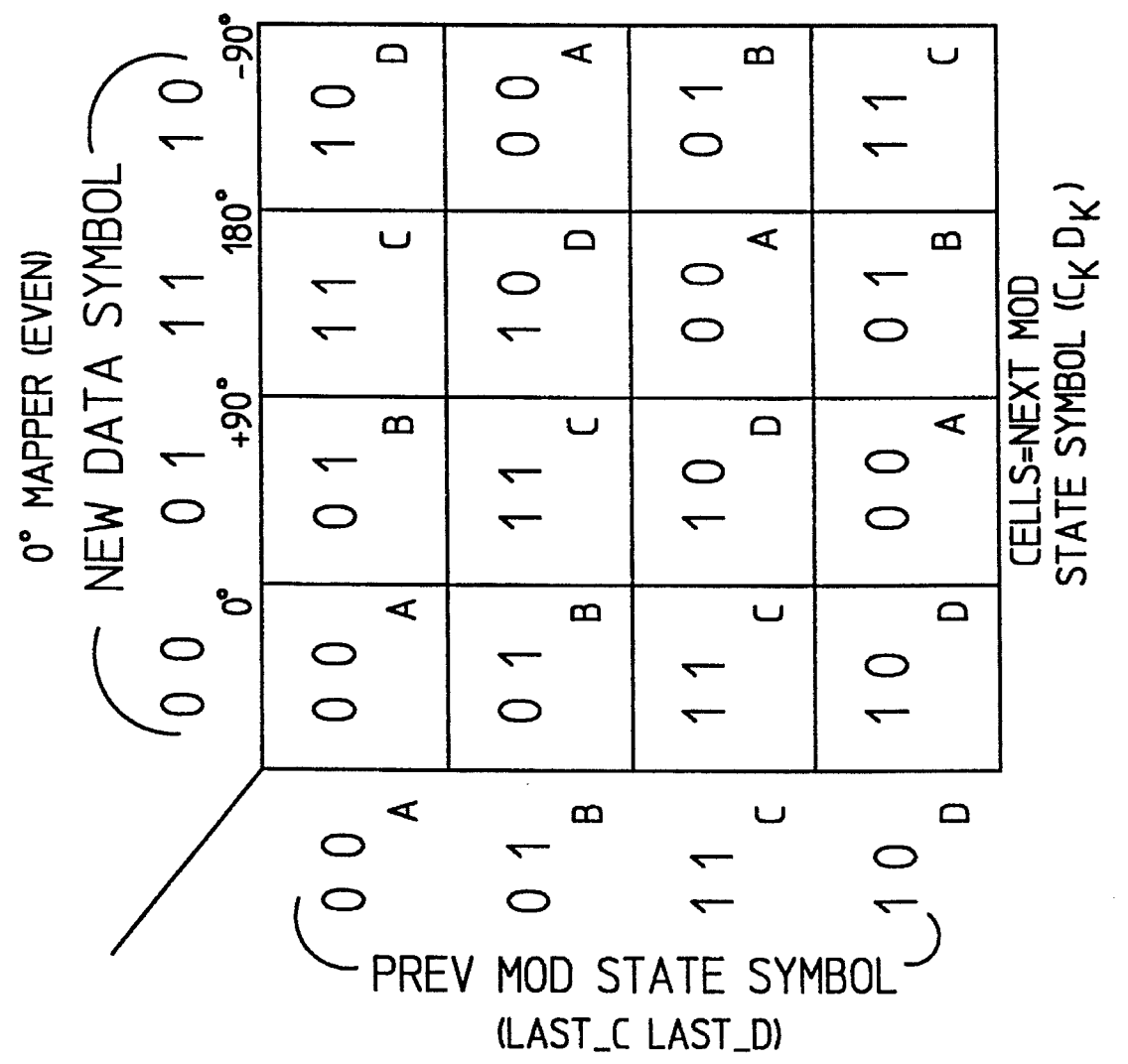

The signal 7 EVEN_ODD is applied to a MUX 8 that functions as a double-pole double-throw switch. The input to the MUX 8 is the two-bit program data symbol contained in the shift register 2. During times when the program data symbol is even the MUX sends that data symbol to a 0° DQPSK Mapper 9; odd program data symbols are sent to a 90° DQPSK Mapper 10. The function of the mappers 9 and 10 is trade the incoming program data symbols for modulation state symbols that are in accordance with an overall modulation format. (For straight QPSK, for example, one bit can be taken to mean the value of I and the other bit the value of Q. In such a simple case no further mapping is needed, and the mappers themselves would be superfluous. DQPSK and π/4 DQPSK don't allow such simplicity, and do require actual mappers.) The Gray-coded mappings performed by the mappers 9 and 10 are shown in FIGS. 2 and 3. As will shortly become clear, the mappers 9 and 10 also each receive as inputs signals LAST_C 16 and LAST_D 17 that represent the most recent modulation state symbol. This information is needed, as it is part of the definition of a differential mapping (the D in DQPSK). Why there are two mappers, and how their outputs cooperate, will be explained in a subsequent section.

The output of each mapper 9 and 10 is two bits, respectively representing a value $C_k$ and $D_k$. These outputs from each of the mappers 9 and 10 are applied to another MUX 11 that also acts as a double-pole double-throw switch. The position of the switch is controlled by the signal EVEN_ODD 7, just as was the MUX 8. During even times mapper 9 is selected by both MUX 8 and MUX 11. During odd times both MUX's select mapper 10.

The $C_k$ output of MUX 11 is coupled to the data input of an eleven-bit C Shift Register 14, while the $D_k$ output is coupled to the data input of an eleven-bit D Shift Register 15. The signal NEW_SYM 5 is coupled to the shift control input of each of shift registers 14 and 15. The newest $C_k$ and $D_k$ are, of course, the values most recently clocked into the shift registers 14 and 15. The signals LAST_C 16 and LAST_D 17 are obtained from the input cells of the C Shift Register 14 and the D Shift Register 15, respectively. Together, these signals 16 and 17 represent the previous modulation state symbol, independent of which mapper produced it. Each mapper needs this information as part of the mapping process. Accordingly, the signals LAST_C 16 and LAST_D 17 are supplied as inputs to each of mappers 9 and 10.

In the present example each of the C Shift Register 14 and D Shift Register 15 has eleven bits; this is, of course, only one of several possibilities. The greater the number of bits the better is the realization of Nyquist behavior for the filter. An odd number of bits says there is a middle about which there can be symmetrical influence for an equal number of modulation state symbols preceding the current (middle) symbol as well as subsequent to the current symbol. Even numbers of cells in the shift registers 14 and 15 do work, however, and increasing the number of cells decreases the effects of asymmetry. The values of the bits in the cells of C Shift Register 14 are grouped together as a C Filter Input 18; the values of the cells of the D Shift Register 15 are likewise grouped together as a D Filter Input 19.

The filter itself consists of four filter ROM's 20–23. These are the C COS ROM 20, the D SIN ROM 21, the C SIN ROM 22 and the D COS ROM 23. All four ROM's 20–23 receive as a most significant address bit the signal EVEN_ODD. The C Filter Input 18 is applied as an address portion of intermediate significance to the C COS ROM 20 and to the C SIN ROM 22. The D Filter Input 19 is likewise applied as an address portion of intermediate significance to the D SIN ROM 21 and to the D COS ROM 23. All four ROM's 20–23 also receive as a least significant address portion the four-bit signal SUB_INT 34. This signal is generated by a counter mechanism (not shown) that divides each symbol period into sixteen intervals. It is during these intervals that the trajectories for the output (the I and Q control signals) from the filter are produced.

In this example each of the filter ROM's 20–23 is shown as having an output of ten bits in width. The particular width is a matter of choice. The outputs of the various filter ROM's are combined as follows. A summer 24 forms the difference C COS–D SIN, which difference is a ten-bit digital I(t) signal 35. A summer 25 forms the ten-bit wide sum C SIN+D COS, which is a digital Q(t) signal 36. The digital I(t) signal 35 is applied to an IDAC 26 whose output analog I(t) signal 37 is thence applied to a filter 28 to produce a filtered analog I(t) signal 39. The digital Q(t) signal 36 is likewise applied to a Q DAC 27 whose output analog Q(t) signal 38 is thence applied to a filter 29 to produce a filtered analog Q(t) signal 40. Filters 28 and 29 merely smooth the stair step transitions in the analog outputs of DAC's 28 and 29. The filtered analog I(t) and Q(t) signals 39 and 40 are coupled to the I and Q inputs, respectively, of an IQ modulator 30. The IQ modulator 30 receives a carrier input signal 31, which is then modulated within the IQ modulator to produce a modulated carrier output 32. The carrier signal 31 could be either an RF signal or an audio signal.

Before continuing with an example of how the structure just described operates, it is perhaps useful to comment on the four ROM—two adder architecture incorporated in FIG. 1. It should be noted that it is explained at some length in the incorporated '613 patent and in the April '91 HP Journal article. That said, it is probably still useful to offer a simplified explanation of just what is going on inside the four filter ROM's and the two adders. This is because both the four ROM—two adder architecture and the MUX—two mapper—MUX structure are ways, or strategies, to reduce the size of the address space needed in the ROM-based filter that does the convolution sums needed to produce digital I(t) and Q(t) signals 35 and 36. They are independent reductions, but to truly recognize and appreciate that independence, it is helpful to know what each stratagem does, and thus why they are different. This also helps to prevent confusing the two, and thus promotes a better appreciation of how the whole thing works.

To begin, suppose that there were just one mapper, and that it were of the standard DQPSK variety. Let there be one filter ROM to produce the digital I(t) signal and one filter ROM to produce the Q(t) signal. The convolution sum that produces I(t) and the one that produces Q(t) are each functions of strings of complete modulation state symbols. Unfortunately, it is not the case that a separable part of the modulation state symbol represents just I, while a remainder represents just Q. Thus, each filter ROM would need both filter inputs. (Since both ROM's are addressed identically, this means that one ROM would suffice if its output width were doubled. The difference between one ROM or two and its output width is not the issue here; the issue is that too many bits of addressing are required for a practical system.)

Suppose that you are determined to use a ROM to find the sum of f(a) and g(b) for arbitrary values of a and b within a limited range. This is easily done if a and b are represented by just a few bits each. Simply apply the bits representing a and those representing b to the ROM as address bits, and arrange for the associated sum to be loaded at each address corresponding to a possible combination of a and b. Now suppose that a is really $\Sigma a_i$ and that b is really $\Sigma b_i$, and that the values of a and b themselves are not explicitly known; all that is available are the various $a_i$ and $b_i$. Upon reflection, you simply apply all of the $a_i$ and $b_i$ as the address. This works, but now suppose that the combined sequence of $a_i$ and $b_i$ is represented by more bits than are available as an address for the ROM. Now what? The answer is to apply the $a_i$ to one ROM whose output is f(a) [$\Sigma f(a_i)$] and to apply the $b_i$ to another ROM to get f(b). Then, add the two ROM outputs with a separate mechanism. The addressability needed has gone down by the amount needed to represent one whole sequence $\Sigma a_i$ (or $\Sigma b_i$).

An appreciation of the nature of the mathematical operations to be performed by the ROM-based filters reveals an I(t) that is found by diminishing a $\Sigma C_k \cos(k\pi/4)$ term by a $\Sigma D_k \sin(k\pi/4)$ term. (The $k\pi/4$ argument comes from a substitution relating DQPSK to $\pi/4$ DQPSK for the $k_{th}$ symbol in a string thereof.) Similarly, Q(t) is found by summing a $\Sigma C_k \sin(k\pi/4)$ term and a $\Sigma D_k \cos(k\pi/4)$ term. Each addressable location in a filter ROM contains the appropriate sum of products, as the various $C_k$ (or $D_k$) in the summation sequence are part of the applied address (coming from the shift registers). Rather than supply both $C_k$'s and $D_k$'s to each filter ROM so that each filter ROM can specify the associated final sum (or difference) as preloaded contents at the various combinations of addresses (values for the sequences of $C_k$ and $D_k$), the idea is to use the ROM's only to find values for the sequence terms $\Sigma C_k \cos$, $\Sigma D_k \sin$, $\Sigma C_k \sin$ and $\Sigma D_k \cos$, and let the final sums and differences therebetween be found by adders that operate on the filter ROM outputs. In this way, a given filter ROM needs only to be addressable over a single sequence of $C_k$ (or $D_k$), rather than over the much larger collection of the Cartesian product of the $C_k$ sequence and the $D_k$ sequence taken together. See Eq's (3), (4), (9) and (10) and the text in col's 5–7 in the '613 patent to Birgenheier.

In a nutshell, Birgenheier reduced the number of address bits needed for the filter ROM's by providing a filter ROM, addressed by $\Sigma C_k$ or $\Sigma D_k$ only, for each use of $\Sigma C_k$ or $\Sigma D_k$ in a sum or a difference (four ROM's needed) as opposed to two ROM's addressed by $C_k$ and $D_k$ together (which then can incorporate the associated sum or difference for free). The four ROM arrangement still needs to compute the final sum and final difference, so the two adders are needed. But the ROM's in the four ROM arrangement have a much smaller address space; it's gone down by the number of bits needed to express $\Sigma C_k$ or $\Sigma D_k$. NOTICE THAT THE REDUCTION ACCOMPLISHED BY BIRGENHEIER DOES NOT AFFECT THE MANNER IN WHICH THE VARIOUS $C_k$ AND $D_k$ (think C Filter Input 18 and D Filter Input 19) ARE GENERATED. A further reduction is possible.

To resume the explanation of the operation of FIG. 1, it will be noted that the general improvement taught by Birgenheier is indeed incorporated. There are four filter ROM's and two adders. But, instead of three bits of 45° phase rotation there is but one: the one-bit signal EVEN_ODD 7. Furthermore, there is an extra mapper and associated MUX's not contemplated by Birgenheier. To appreciate the operation of FIG. 1 refer now to the mapper tables shown in FIGS. 2 and 3.

FIG. 2 is a tabular arrangement depicting, for the 0° mapper 9, what modulation state symbol is produced for all combinations of new 2-bit data symbols (from shift register 2) and the preceding 2-bit modulation state symbol. The new data symbols are simply the incoming pairs of bits that are the program material to be modulated onto the carrier and then transmitted. Their larger meaning exists only in the context of the program data; as far as the table in FIG. 2 is concerned, the input data symbols are just the various possible combinations of two bits. The various modulation state symbols (next or previous) do have meaning within the modulation format, as will become clear as the example proceeds to include FIGS. 4–7. (Also, the small legends A–D and 0°/+90°/180°/–90° acquire meaning in the context of FIGS. 4–7, and will be useful in connection with the example illustrated by those figures.) Those familiar with DQPSK will recognize the mapping of FIG. 2 as the regular one employed for that service.

FIG. 3 is a mapping identical in overall form to that of the one depicted in FIG. 2; however, it's substance is a different relationship between the input variables and the outputs. That is, the mappings of FIGS. 2 and 3 are both mappings from the same something to something else; they are just different mappings. It will soon become clear that the difference corresponds to a 90° phase shift. That is, if DATA_SYM were a particular input to each mapper, and EVEN_MAP_OUT and ODD_MAP_OUT are the output of the different mappers, then-the relationship "ODD_MAP_OUT minus EVEN_MAP_OUT equals 90°" makes sense.

Figure 4:
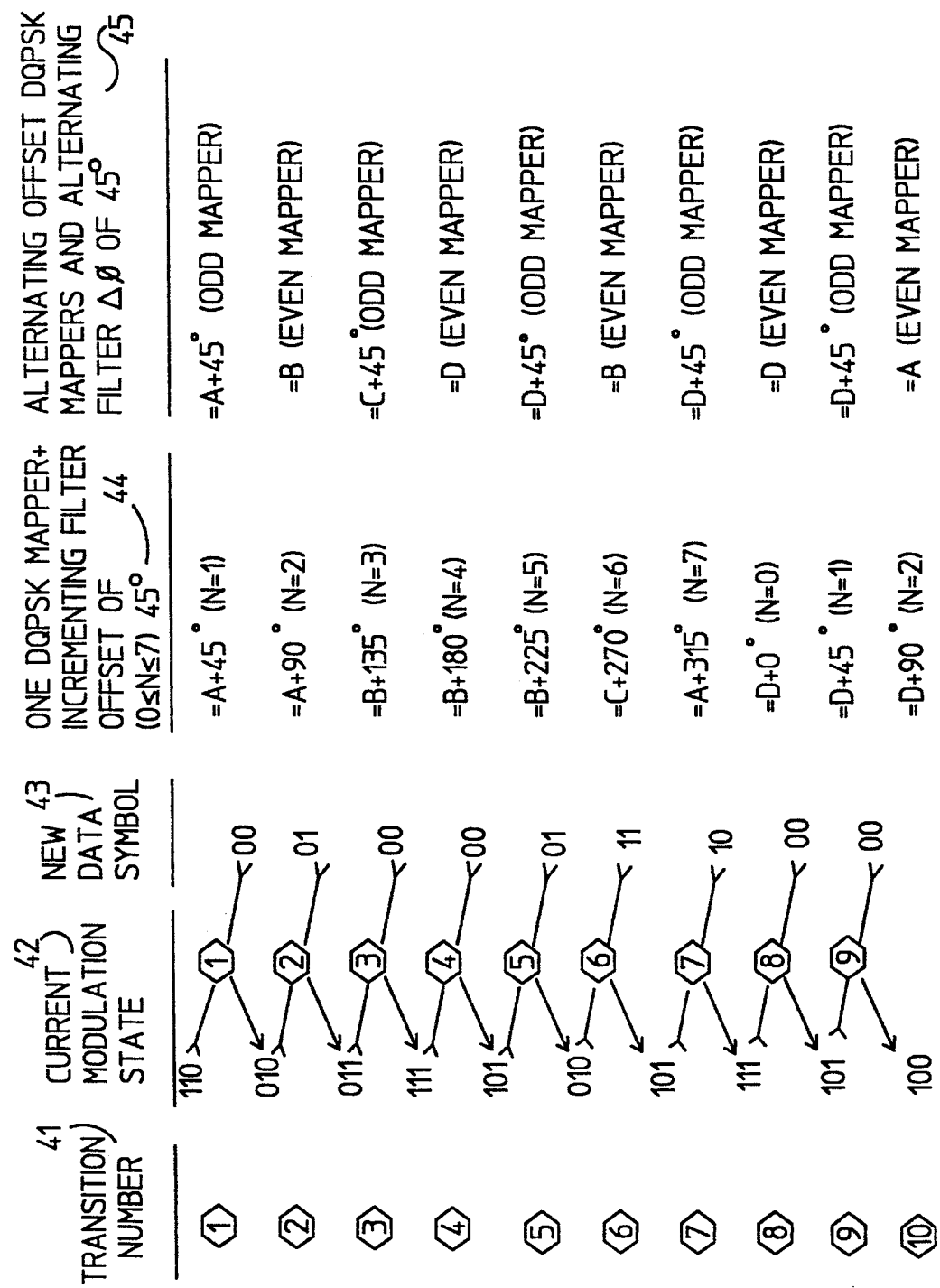
FIG. 4 is an example list of π/4 DQPSK modulation state transitions and ways in which these can be represented while using a single DQPSK mapper and also while using a more sophisticated mapper that more directly corresponds to π/4 DQPSK.

Now, one way to produce π/4 DQPSK is to impose (in the filter) a regularly increasing 45° precession on the modulation state symbol, over and above variations called for by the basic DQPSK mapping. That we don't wish to do, but we do take note that such a mechansim can be used to introduce single 45° phase shifts. Call the regular DQPSK mapping a 0° mapping. How is alternating between 0° and 90° mappings for consecutive incoming data symbols going to produce a 45° precession? By their differential nature, coupled with cross-coupled alternation (last time's output from one mapper is next time's input to the other), the combination of the 0° and 90° mappers produce a 90° precession for every other symbol, and no precession for the intervening symbols: [0°, 90°], [0°, 90°], . . . , where the grouping of the brackets represents a common point of reference for each precession value. This produces a coarse precession. A fine precession is obtained by coupling each 0° mapping with a 45° shift in the filter, while not introducing any such shift during 90° mappings. We may reference each amount of precession to the preceeding symbol, and drop the brackets to get: 45°, 45°, 45°, 45°, . . .. Refer now to FIG. 4 for an example that shows how this works.

Figure 5:
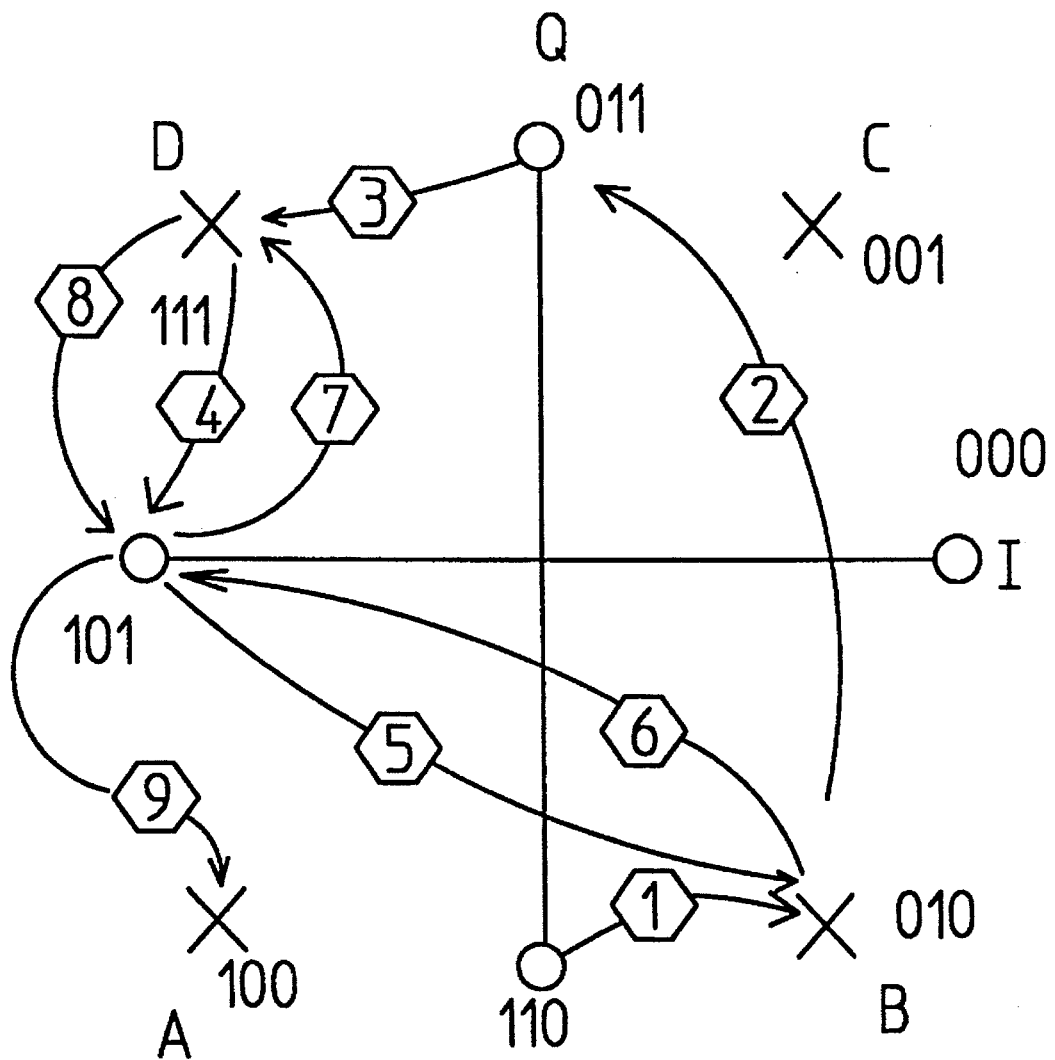
FIG. 5 is a constellation diagram representing the π/4 DQPSK modulation state transitions in the example of FIG. 4.

FIG. 4 depicts an example π/4 DQPSK transition diagram for some definite, but arbitrarily selected, sequence of input data symbols. The column 41 labelled TRANSITION NUMBER is simply a sequential numbering of the transitions occurring in the example. They are enclosed in hexagons to assist in finding their corresponding locations in FIGS. 5–7. The column 42 labelled CURRENT MODULATION STATE lists the sequence of three-bit descriptions of the different π/4 DQPSK modulation states called for in the example. Since there are eight states in π/4 DQPSK it takes three bits to represent them all. The column 43 labelled NEW DATA SYMBOL depicts the newly arrived input from the program data. The combination of the existing state in column 42 and the new input in column 43 produces the next lower entry in column 42. FIG. 5 is a depiction of the resulting constellation diagram. Notice how the example visits both X's and O's, indicating that no mere two-bit representation can fully describe the sequence.

Figure 6:
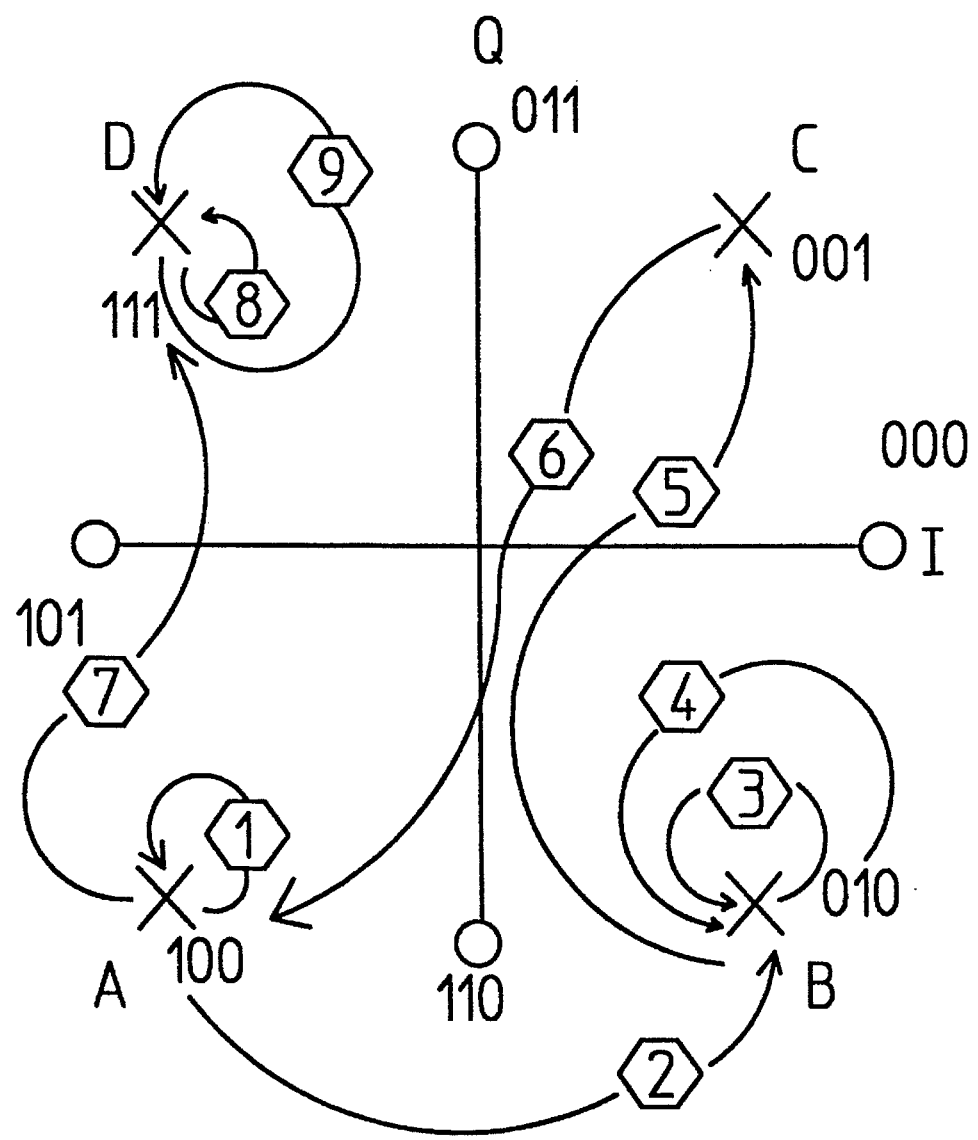
FIG. 6 is a constellation diagram representing a DQPSK mapper's output for the example of FIG. 4.

Column 44 depicts how a standard DQPSK mapper can be used with a filter that has as an additional input a count that represents an increasing but cyclic multiple (0–7) of 45° offsets used to produce precession. Column 44 should be viewed in conjunction with FIG. 6. Notice that only X's are visited in FIG. 6. FIG. 6 and column 44 are descriptions of mapper activity, and it is clear that the device of incorporating an incrementing integral number of 45° phase shifts in the filter allows the mapper to traverse among just four states, which are labelled A–D. That is, column 44 is a way to operate upon a standard DQPSK mapper's output of four symbols A–D to produce the particular sequence of modulation state transitions shown in FIG. 5. This works, but requires filter ROM's of four times the address space of the filter ROM's for the technique represented by FIG. 7 and column 45.

Figure 7:
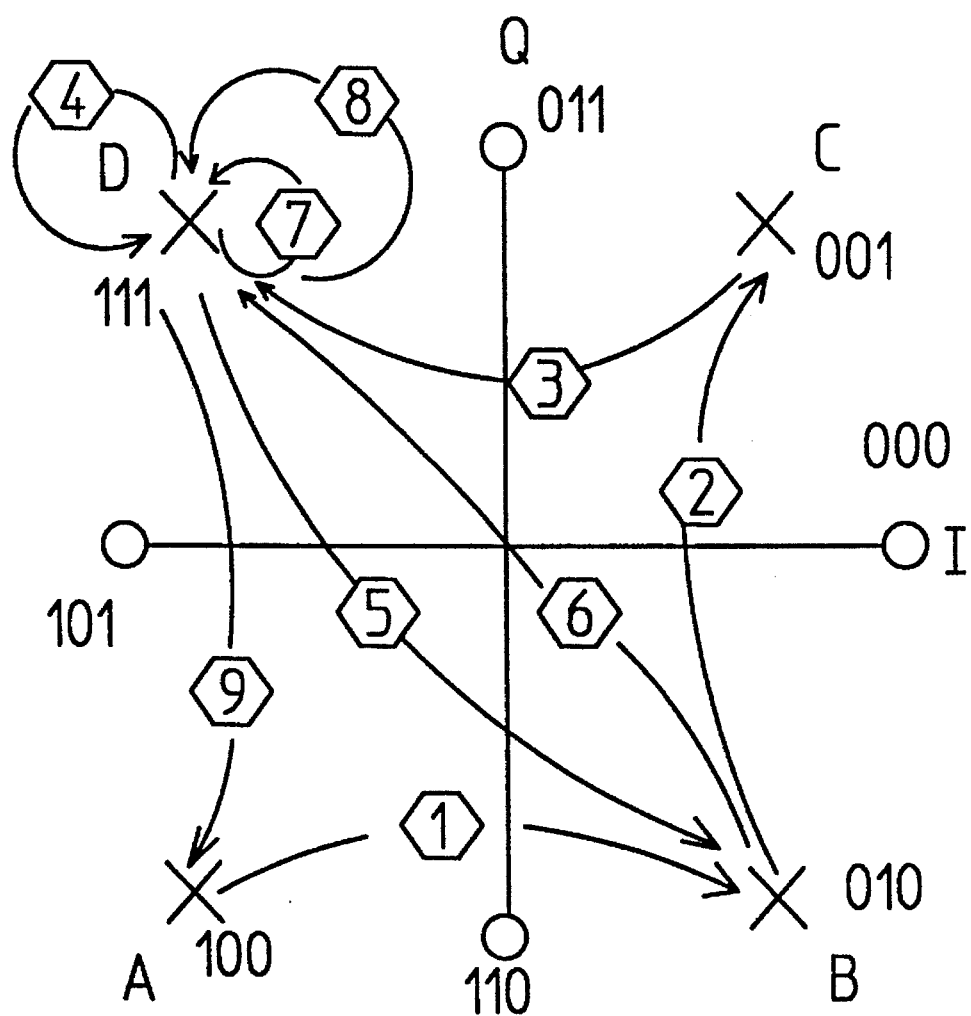
FIG. 7 is a constellation diagram representing a more sophisticated alternate symbol π/4 DQPSK mapper output for the example of FIG. 4.

Column 45 and FIG. 7 show another way to represent the sequence of modulation state transitions shown in FIG. 5, while using just four symbols A–D from a mapper. That new mapper is implemented in the hardware block diagram of FIG. 1 as a pair of mappers used in alternation. It could as well be a single mapper that is of complexity adequate to produce the sequence shown. Notice that the representation in column 45 requires only a single bit to represent the amount of 45° offset to be supplied by the filter.

To actually execute the example sequence of transitions listed in column 42 one should consult FIGS. 2 and 3. There should be no need to recount all of it here, but it may helpful to trace the start of each of columns 44 and 45. The method of column 44 requires only the mapper of FIG. 2. The initial modulation state is 110, which is A+45°. The input data is 00, which according to the mapping of FIG. 2 maps A into A. Meanwhile a three-bit counter increments to increase the amount of precession, and the 45° offset introduced by the filter becomes 90°. Now we are ready for the second transition. The input data is 01. The mapper maps a previous state of A into B for an input of 01. The incremented offset now becomes 45° larger, or 135°.

The method of column 45 is as follows. The initial modulation state is 110. This is represented by A+45°. This is an output from the even mapper, so the odd (90°) mapper (FIG. 3) is used next in mapping the incoming data symbol. That input is 00. The mapper of FIG. 3 maps a current modulation state symbol of A and an input data symbol of 00 into a next modulation state symbol of B. (Compare that to the 0° mapper of FIG. 2.) By the end of transition #1 the 45° offset from the filter has been removed, leaving just B as the new modulation state. The next input data is 01. Now the even (0°) mapper of FIG. 2 is used. It maps a present modulation state of B and new input data symbol of 01 into a next modulation state of C. This use of the even mapper is accompanied by a return of the 45° offset, to produce a final result for transition #2 of C+45°. The next modulation state symbol is produced by the odd mapper. It maps the present modulation state of C and the new data input of 00 into a next modulation state of D. This use of the odd mapper is accompanied by a withdrawal of the 45° offset, so that the final result for transition #3 is simply D.

Before leaving the tabular presentation of FIG. 4 it is useful to take note of certain relationships made visible therein. First, note that the representations needed for column 44 ultimately require every combination of the modulation state symbols A–D with the eight different offset values of 0° through 315°. That comes to a total of thirty-two different combinations, requiring five bits of addressing for its representation to the ROM's in the filter. Now note that there are but eight different possibilities for the technique of column 45. In fact, the contents of column 45 are a subset of the contents of column 44, for all possible examples. This has an important and useful consequence, for it means that the operations performed by reduced-address-space filter ROM's for column 45 are simply a subset of those performed by the filter ROM's for the technique of column 44. This supports the idea that, as black boxes, the filters are equivalent, and that they need not be used in pairs of the same type, but can be mixed and matched within a communications channel.

Unfortunately, however, this does not mean that the two types of filters have identical contents stored in their ROM's. To appreciate why this is so it is necessary to return briefly to the $\Sigma C_k \sin(k\pi/4)$ and $\Sigma D_k \sin(k\pi/4)$ sums that are produced from the inputs to the filter ROM's. In the scheme described by Birgenheier the argument $(k\pi/4)$ is taken (after a change of variables, see col. 7 from line 33 on in the '613 patent) as being modulo. For the reduced addressing filter ROM's described herein it is taken modulo 2. This reflects the difference between having three address bits for the filter ROM's to describe zero to seven 45° precession increments compared to one bit (EVEN_ODD) describing the presence or absence of a single 45° offset. With this simple change the design equations (14) and (15) set out in col. 8 of the '613 patent can be used to compute the contents of the reduced addressing filter ROM's 20–23 described herein.

Another way to appreciate this is to consider the meaning of a modulation state symbol as it propagates through the shift registers 14 and 15 (one part of the symbol is in one shift register and one part is in the other, but they are shifted in unison). At the time it entered the shift registers it had associated therewith a certain amount of precession: i.e., the amount that was in effect at the time the symbol was generated. That association does not change, but notice that it is implicit, or indirectly represented, because it is not part of the modulation state symbol itself, and at any one time a great many modulation state symbols are applied as addresses to the filter ROM's, but only one precession indicator. Why is that? Well, the precession indicator, whether of the three-bit variety (k equals zero to seven 45° precession increments) or of the one-bit variety (EVEN_ ODD for 0° and 90° mappers) is implicitly associated with some particular modulation state symbol (say, the center one) among the plurality thereof applied to the filter. So, for example, in the Birgenheier arrangement a three bit precession indicator of 011 (three) implies that the center symbol (fifth one up in our example of eleven positions in the shift registers) corresponds to the third amount of incremented precession (probably 90°, after 0° and 45°). By implication the symbol in shift register position four is associated with a precession indicator of 100, the one in position three with 101, and the one in position two with 110, and so on. Position six would be associated with a precession indication of 010, and so on. The three bit field increments and decrements just as a three bit counter would, so a decreasing 000 changes to 111, and an increasing 111 changes to a 000. Because each symbol is not accompanied by its own individual count (eleven times three is thirty-three bits!), and only the count for the center symbol is supplied to the ROM's, the incrementing and decrementing for successive adjacent symbols is implied, and is reflected in the values that are computed for the various addresses in the filter ROM's. In contrast, the technique associated with the one-bit EVEN_ODD signal and the reduced address space filter ROM's uses a precession filter indicator whose values Change thus: 0, 1, 0, 1, 0, 1, .... So, the filter strategy really is different, and the numbers in the filter ROM's do have to be recomputed.

Lastly, it will be noted that the maximum reduction has been achieved. The four symbols A–D require two bits and the solitary 45° phase shift requires one bit, for a total of three. Three bits are what is required to represent eight symbols, and in this case the eight symbols are those of π/4 DQPSK. Our representation of those eight symbols A–D with the alternating 45° offset is just a convenient one; if one were a glutton for punishment the whole thing could be described in terms of the 000–111 modulation states of FIG. 5.

However, it would be a mistake to think that these results suggest that it is desirable to put all the complexity of the π/4 DQPSK format into a pair of mappers (or into a single more complicated mapper). What is needed is to simultaneously minimize the number of bits for modulation state symbols produced by the mapper and also reduce the number of bits needed to describe the precession. An effective way to achieve that is to let the mapper introduce some coarse precession every other symbol, or every fourth symbol, or in a format with many symbols, every eighth symbol. Then the filter supplies a fine precession that can be indicated by one, two or three bits. One would choose the mix between coarse and fine according to which one requires the least number of addressing bits for the filter ROM's. It must be remembered that if there are k-many cells in each shift register, then each time a bit is added to the width of a modulation state symbol, k-many bits are added to the address of the filter ROM's. Therefore, the mapper's ability to represent precession should be exploited to the greatest extent possible, even if it means that the result is a coarse precession ocurring only every other symbol, or every fourth symbol, etc. Such coarse precession from the mapper can then be augmented by a fine precession introduced by the filter for the intervening every other or three out of four symbols, and represented by a single collection of just a few bits. However, putting all the complexity into the mapper or into the filter unduly increases the number of bits needed to address the filter ROM's.

The novel conception described herein views the alternating 45° offset bit EVEN_ODD as some (particular) bit in the modulation state encodings that always toggles every symbol. Given the nature of π/4 DQPSK this is not surprising. Reduced to its basic concept, then, we have shown that the ROM-based filter can be minimized to recognize a different sequence of DQPSK modulation state symbols accompanied by a precession indicator for an amount of "incremental" precession that never exceeds the minimum phase difference between any two modulation state symbols. This requires that the mapper produce for each "real" π/4 DQPSK modulation state symbol a description in terms of DQPSK plus an incremental precession, and requires that the amount of incremental precession be described to the filter.

I claim:

1. A modulator comprising:

a mapper coupleable to digital program data and that produces therefrom modulation state symbols that exhibit a coarse precession that occurs every nth modulation state symbol, where n is an integer greater than one;

a shift register having an input coupled to receive the modulation state symbols and having a plurality of outputs representing a sequence of consecutive modulation state symbols;

a ROM addressed by the outputs of the shift register and by a collection of cyclically incrementing bits representing a fine precession that is zero for every nth modulation state symbol exhibiting the coarse precession, and that at times when intervening modulation state symbols occur adds fine precession by an amount equal to 1/nth the coarse precession, the ROM producing at each addressable location an I control value and a Q control value; and an IQ modulator coupled to receive the I and Q control values.

2. A modulator as in claim 1 wherein the modulator is a π/4 DQPSK modulator, the coarse precession is 90° and the fine precession is 45°.

3. A modulator as in claim 2 wherein the mapper comprises a first encoder implementing DQPSK and a second encoder whose output is displaced 90° from DQPSK, and wherein each nth modulation state symbol that exhibits coarse precession is produced by the second encoder.

4. A modulator as in claim 1 wherein the ROM is further addressed by a collection of cyclically incremented bits representing subintervals between modulation state symbols, and wherein that collection of bits increments through a cycle once for each modulation state symbol.

5. A modulator as in claim 1 wherein the ROM comprises a first cosine value ROM and a first sin value ROM and the I control value is formed by diminishing the output of the first cosine value ROM by the output of the first sin value ROM, and also wherein the ROM comprises a second cosine value ROM and a second sin value ROM and the Q control value is formed by adding the output of the second cosine value ROM to the output of the second sin value ROM.

6. A method of IQ modulation comprising the steps of:

mapping digital program information into modulation state symbols exhibiting coarse precession every nth modulation state symbol;

filtering the modulation state symbols to produce filtered modulation state symbols exhibiting a uniform precession for each such symbol, the filtering introducing a fine precession, equal in amount to 1/nth of the coarse precession, for each intervening modulation state symbol ocurring between each nth modulation state symbol.

\* \* \* \* \*